No. 884,033. PATENTED APR. 7, 1908.
J. B. McKENNAN.
FURNACE VALVE.
APPLICATION FILED MAY 14, 1906.

2 SHEETS—SHEET 1.

Witnesses
J. B. McKennan, Inventor
By Walter D. Groesbeck,
his Attorney

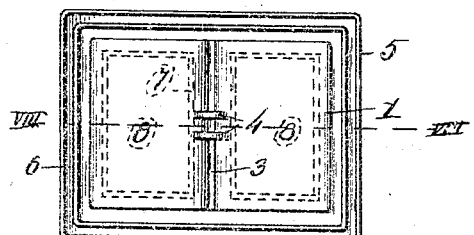
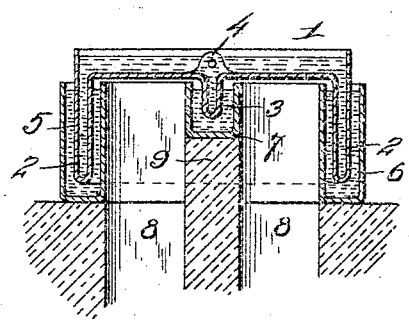
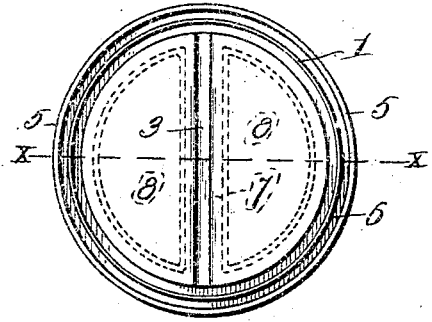
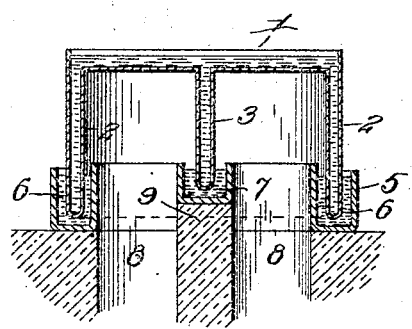
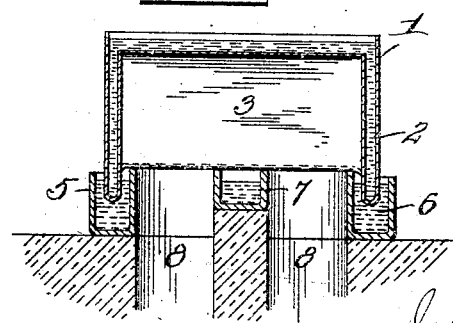

UNITED STATES PATENT OFFICE.

JACOB BOWMAN McKENNAN, OF PUEBLO, COLORADO.

FURNACE-VALVE.

No. 884,033.     Specification of Letters Patent.     Patented April 7, 1908.

Application filed May 14, 1906. Serial No. 316,772.

*To all whom it may concern:*

Be it known that I, JACOB BOWMAN MC-KENNAN, a citizen of the United States, residing at Pueblo, in the county of Pueblo and State of Colorado, have invented certain new and useful Improvements in Furnace-Valves, of which the following is a specification.

Figure 1:
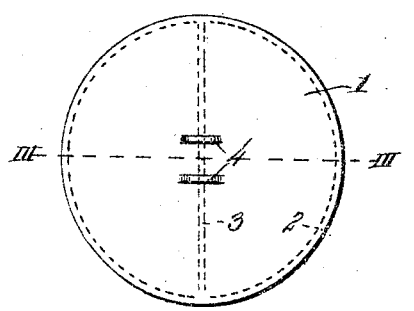
Figure 2:
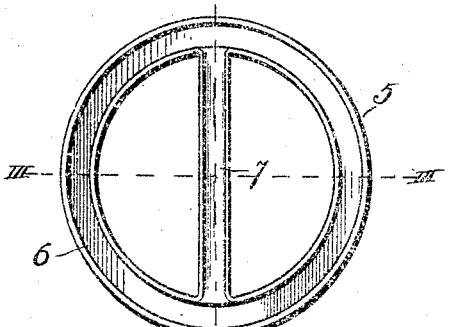
Figure 3:
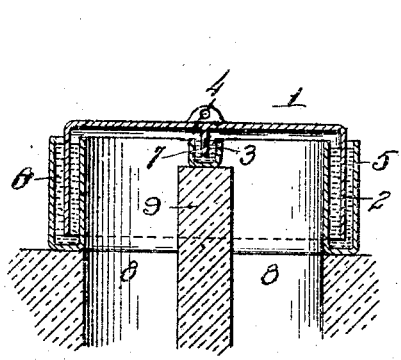
Figure 4:
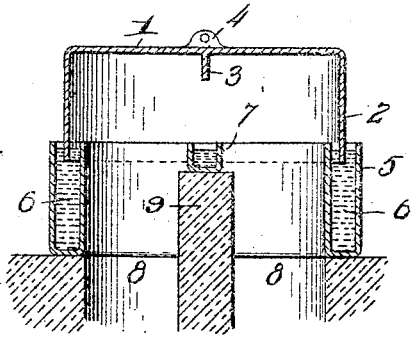
Figure 5:
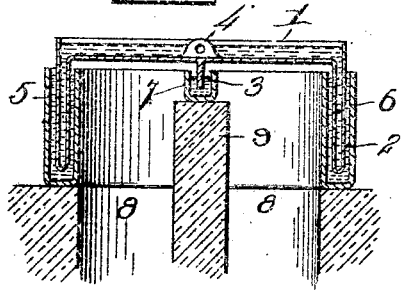
Figure 6:
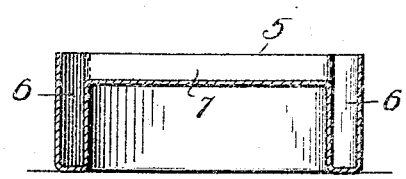

My invention relates to water - sealed valves for furnaces, and its object is to provide a simple lift-valve for controlling the admission and amount of flow of gases between a pair of parallel furnace-flues, producer-flues, draft-flues, or the like, in which the operating mechanism shall be easy of access, not exposed to the hot gases, and require no stuffing-boxes for the moving parts. I attain these objects by the constructions illustrated in the accompanying drawings, in which:

Figure 1 is a plan of one form of my improved valve; Fig. 2 is a plan of the water-pan for same; Fig. 3 is a section on the line III—III of both valve and pan, showing them assembled and the valve closed; Fig. 4 is a section on the same line showing the valve fully open; Fig. 5 is a section on a line corresponding to the line III—III of Fig. 1 of a modified form of valve adapted to be water-cooled; Fig. 6 is a section on the line VI—VI of Fig. 2; Fig. 7 is a plan of a further modification adapted for use with flues of rectangular section; Fig. 8 is a section on the line VIII—VIII of Fig. 7; Fig. 9 is a plan of a further modification in which the valve is adapted to be given a short lift and partial rotation; Fig. 10 is a section on the line X—X of Fig. 9; showing the valve closed, and Fig. 11 is a section on line X—X of the water-pan portion of Fig. 9, but showing the valve lifted and rotated 90°.

1 is the valve-hood, preferably of malleable metal; provided with a comparatively-deep peripheral flange 2, and a narrower, or shallower, intermediate interior flange 3, which may be solid as in Figs. 1 to 5, or water cooled as in the remaining figures; 4 is any suitable attachment for the lifting mechanism or stem (not shown).

The water pan 5, also preferably of malleable metal, is provided with a comparatively-deep peripheral trough 6 and with a shallower, transverse intermediate trough 7; the trough 6 surrounding the extremities of the paired, vertical flue-terminals 8, 8 and the trough 7 resting upon the top of the wall 9 which separates the flues.

The water-pan and valve are preferably circular in plan and the parallel flues semi-circular in section; though the valve may be adapted to systems already installed and having flues rectangular in section; as shown in Figs. 7 and 8.

In the modification shown in Figs. 10 and 11, the peripheral trough 6 is made shallower, the diametrical partition-flange deeper, and the valve adapted to operate with a much shorter lift.

The operation is as follows:—Assuming that the valve is provided with lifting mechanism constructed and arranged to lift the hood any desired distance and support it at any desired point, and starting from the closed and water-sealed positions of Figs. 3 and 10, the flow of gas, air or products of combustion may be started and regulated as desired, by raising the valve to the required extent; thus connecting the flue-terminals without breaking the outer water-seal, because of the greater depth of the marginal hood-flange.

In the modification illustrated in Figs. 10 and 11, the hood-chambers are of greater depth, and the flow may be regulated by raising the valve until the partition-flange 3 clears the edges of the trough 7 and rotating the hood through any desired angle up to 90°; at which point the valve will be fully opened. Any lesser amount of rotation will allow any desired flow of fluid between the flue-terminals as will be readily apparent.

It will be understood that suitable provision is made for maintaining the water-level in the sealing-pan practically constant.

I am aware that water-sealed reversing-valves have been designed in which four flue-terminals are capped by a valve-hood having a diametrical partition of substantially the same depth as the peripheral flange and arranged to permit the passage of fluids between pairs of such terminals in a direction parallel to the length of the hood-partition; but in such construction the hood is raised only during the reversing movement, the flues are always connected in pairs, and the valve is not capable of use as a simple opening-and-closing valve.

Many changes may be made in my construction by those skilled in the art, without departing from my invention; since

What I claim is—

1. A furnace valve structure comprising a plurality of coterminous vertical flues, a water-pan surrounding and separating said flues, and a lift-valve having a transverse partition, and an integral upturned flange deeper than the valve hood, to form a water-cooling chamber for the hood-top and rim; said valve being adapted, when seated, to seal from each other all flues controlled thereby; substantially as described.

2. A furnace valve structure comprising a pair of coterminous vertical flues, a water-pan surrounding and separating said flues, said separating portion being of less depth than the marginal portion, and an integral lift hood having an upturned flange extending above the hood-top and a water cooled partition of less depth than the hood and adapted to seat in the flue-separating portion of the water-pan; substantially as described.

3. In a furnace valve, in combination, a water-pan constituting the terminal of each of a plurality of parallel flues, said pan having peripheral and diametrical channels, and a valve hood having marginal flanges and an intermediate partition of less depth than said flanges, said valve being constructed and arranged to seal each of said flue-terminals when in closed position, and to be raised and rotated to permit and control the flow of fluid between said flues; substantially as described.

4. In a furnace valve, in combination, a water-pan constituting the terminal of each of a plurality of parallel flues, said pan having peripheral and diametrical channels, and a valve hood having water-cooled marginal flanges and an intermediate water-cooled partition of less depth than said flanges, said valve being constructed and arranged to seal each of said flue-terminals when in closed position, and to be raised and rotated to permit and control the flow of fluid between said flues; substantially as described.

In testimony whereof I affix my signature in presence of two witnesses.

JACOB BOWMAN McKENNAN.

Witnesses:
   Jas. H. Robinson,
   H. Cozzens.